US007743894B2

(12) United States Patent
Scheckelhoff et al.

(10) Patent No.: US 7,743,894 B2
(45) Date of Patent: Jun. 29, 2010

(54) BRAKE ACTUATOR REINFORCEMENT AND METHOD OF ATTACHING SAME

(75) Inventors: Kenneth Scheckelhoff, Elyria, OH (US); Ron Plantan, Elyria, OH (US); Brett Darner, Wellington, OH (US); Christopher Olin, Middleburg Heights, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 725 days.

(21) Appl. No.: 11/523,048

(22) Filed: Sep. 19, 2006

(65) Prior Publication Data
US 2008/0067017 A1 Mar. 20, 2008

(51) Int. Cl.
*F16D 65/24* (2006.01)
(52) U.S. Cl. ............... 188/170; 188/153 D; 188/153 R; 92/169.2; 29/505; 29/509
(58) Field of Classification Search ................. 188/170, 188/171, 153 D, 153 R, 72.4, 72.6, 72.9, 188/369; 92/62, 63, 64, 169.1, 169.2; 29/888.06, 29/521, 505, 509, 513, 515, 516
See application file for complete search history.

(56) References Cited

U.S. PATENT DOCUMENTS

| 4,031,814 | A | * | 6/1977 | Lukens et al. ................. 92/63 |
|---|---|---|---|---|
| 4,366,612 | A | | 1/1983 | Dorsett et al. |
| 4,907,496 | A | | 3/1990 | Neal |
| 4,960,036 | A | * | 10/1990 | Gummer et al. ................. 92/63 |
| 5,377,579 | A | * | 1/1995 | Pierce ............................. 92/63 |
| 5,588,348 | A | * | 12/1996 | Plantan et al. ................. 92/63 |
| 5,623,863 | A | | 4/1997 | Plantan |
| 5,791,232 | A | * | 8/1998 | Smith ......................... 92/128 |
| 5,829,339 | A | * | 11/1998 | Smith ............................. 92/63 |
| 5,836,233 | A | | 11/1998 | Rumsey |
| 6,029,447 | A | * | 2/2000 | Stojic et al. ................... 60/453 |
| 6,050,372 | A | * | 4/2000 | Fisher ......................... 188/170 |
| 6,378,414 | B1 | | 4/2002 | Constantinides et al. |
| 6,394,462 | B1 | * | 5/2002 | Constantinides et al. ..... 277/502 |
| 7,025,181 | B2 | * | 4/2006 | Affeldt et al. ................. 188/170 |
| 7,493,994 | B2 | * | 2/2009 | Plantan et al. .......... 188/153 D |
| 2006/0131116 | A1 | | 6/2006 | Plantan et al. |

* cited by examiner

*Primary Examiner*—Robert A Siconolfi
*Assistant Examiner*—Mariano Sy
(74) *Attorney, Agent, or Firm*—Crowell & Moring LLP

(57) ABSTRACT

In order to safely and conveniently assemble and service new design spring brake actuators having power springs located in the middle of the actuator, the actuator's rear chamber cover must be able to withstand high localized forces from tools such as power spring compression rods. A reinforcement and method for its installation is provided, in which a plurality of reinforcement plates is stacked on the rear chamber cover about a tool-insertion aperture, and the outermost plate is crimped about the aperture, thereby securing the plates to the rear chamber cover in a cost- and time-efficient manner. Preferably, the lip of the rear chamber cover aperture is stamped when the cover is formed such that the lip protrudes axially outward to help assure that the lip is captured between the crimped reinforcing plate on one side and the remaining reinforcing plates on the other side.

15 Claims, 5 Drawing Sheets

BRAKE ACTUATOR REINFORCEMENT AND METHOD OF ATTACHING SAME

BACKGROUND AND SUMMARY OF THE INVENTION

The present invention relates to an attachment for securing reinforcing plates, and a method for attaching such plates, in particular attachment to a spring-type vehicle brake actuator.

So-called "spring brake" actuators are employed to provide service, parking and emergency brake functions on vehicles such as commercial trucks, tractors and trailers equipped with lever-operated drum or disc brakes. Spring-type brake actuators are typically pneumatically operated, and are supplied with operating air from a compressed air source on the vehicle. These actuators also typically are arranged in a "fail-safe" manner, i.e., where the actuator defaults to a brake application state upon loss of operating air pressure. Such actuators may be employed on different types of brakes; FIG. 1 shows a conventional application of a pneumatic spring brake actuator 100 mounted at a mounting flange 103 via stud 101 and nut 102 to a disk brake caliper 200. Caliper 200 straddles brake disk 201 (shown in partial view) in the usual manner.

An example prior art spring brake actuator is shown in cross-section view in FIG. 1. Actuator housing 1 includes a rear cylinder 2 in which a rear piston 3 is displaceably arranged. The terms "front" and "rear" as used herein describe the directions facing toward and facing away, respectively, a vehicle brake to which the actuator is mounted. The inner wall of the rear cylinder and a chamber-side of the rear piston define a rear ventilation chamber 4. The other side of the rear piston bears on a brake actuator spring 5. This spring is also known in the art as a "power spring" or a "parking brake spring," and these terms may be used interchangeably. For consistency herein, the terms "brake actuator spring" or "actuator spring" will be used.

The rear ventilation chamber is isolated from the spring side of piston 3 by an annular seal 6. An intermediate flange 8 (also known as a "wall") separates rear cylinder 2 from a front cylinder 9. The intermediate flange 8 traversed by a seal 10 through which passes a sliding rod 11, formed as an extension of rear piston 3. The sliding rod 11 can be displaced in the intermediate flange 8 by the rear piston. A front ventilation chamber 7 within front cylinder 9 is delimited by the cylinder inner wall and a front piston 13 and annular diaphragm 14. The rear piston 3 and the front piston 13 are in non-coupled contact with one another by means of the sliding rod 11, such that the front piston 13 can be displaced in a brake application direction by the rear piston 3. An actuating rod 15 for actuating a brake lever of a vehicle brake is provided on the front side of the front piston 13.

When no pneumatic pressure is present in the FIG. 1 actuator unit, the brake actuation spring 5 applies a high spring force to rear piston 3, which in turn applies this force via sliding rod 11 to front piston 13 to cause the actuator rod 15 to apply the vehicle brake. In this state, the vehicle brake functions as a parking brake, preventing vehicle movement. When release of the parking brake is desired, the rear ventilation chamber 4 is filled with compressed air via port 19. As the force generated by the increasing air pressure on the front side of rear piston 3 exceeds the force generated by brake application spring 5, the rear piston 3 and sliding rod 11 move toward the rear of the rear cylinder 2, compressing spring 5. At the same time, as sliding rod 11 moves towards the rear, the force previously applied to front piston 13 is relieved, and a return spring 18 biases the front piston 13 toward the rear of front cylinder 9, thereby withdrawing actuating rod 15 away from and releasing the vehicle brake.

The foregoing type of spring brake actuator is complicated, difficult to produce and service, and suffer from a number of inherent problems. For example, in order to generate the very high brake application force needed to ensure full brake application in parking or emergency situations, the brake actuator spring must be powerful. As a result, brake actuator springs are large, heavy and store potentially dangerous amounts of energy when compressed. This requires that the spring brake housing to be heavily built, with relatively thick housing walls and high strength materials, to provide reliable containment of the spring and to provide an adequate foundation to absorb the reaction force of the spring as it presses against the rear end of the housing. This need is particularly acute in the case of prior art actuators, where the housing is continuously subjected to very high loads imposed by the actuator spring, and the housing must be designed to reliably withstand these loads during years of continuous exposure to harsh operating conditions. Ultimately, the need for such heavy housing construction undesirably increases the weight, size and cost of the actuator components. Another problem with prior art spring-type brake actuators is the potential for injury or property damage if the brake actuator spring is not properly handled during both actuator manufacture and servicing. The typical spring brake actuator is constructed with a rear portion being detachable from the front portion of the actuator. However, because this rear portion is often the sole component retaining the brake actuator spring, great care must be taken to ensure the spring remains captured or "caged" if the rear portion is to be removed, lest the spring or the rear portion of the actuator be accelerated in an uncontrolled manner away from the housing as it is being disassembled for service. Similar concerns exist during manufacture, where the springs must be carefully controlled during actuator assembly to prevent their inadvertent escape.

In view of the problems with these type of prior art spring-type brake actuators, an improved actuator has been developed which is safer, lighter, simpler, more reliable, less costly and/or safer to assemble and service. This spring brake actuator, the subject of U.S. patent application Ser. No. 11/012,313 (the disclosure of which is incorporated herein by reference in its totality), eliminates the need for heavy housing structures and extra brake actuator spring capture features by substantially rearranging the primary components of a spring brake actuator. As shown in FIG. 2, in one embodiment the brake actuator spring 300 is relocated to the front portion 301 of the actuator housing, occupying a region 302 between the front service brake actuator 303 and the rear parking brake release actuator 304. When the spring brake actuator is inactive (i.e., no pressure exists in either the front or rear chambers), the brake actuator spring applies the vehicle brake by pressing on the service brake actuator 303 via an intermediate spring plate 305, and the service brake actuator in turn presses the brake actuator rod 306 forward in a brake application direction. The parking brake release actuator 304 remains in the rear chamber 307 of the actuator housing, but instead of pressing directly on the service brake actuator (as in the previous prior art example), its attached shaft 308 is now solidly affixed to the rear side of the intermediate spring plate 305. Thus, when air pressure is applied to the rear chamber, rather than compressing the brake actuator spring into the rear end of the actuator housing, as in the prior art, the present invention's parking brake release actuator draws the intermediate spring plate toward the intermediate body portion of the actuator 309 (hereinafter, the "housing intermediate flange"), compressing the brake actuator spring against the front side (or "floor") of the intermediate flange to remove the spring's force from the actuator rod. For servicing and other purposes, the parking brake may also be manually released, as shaft 308 is provided with a threaded bolt 310 extending through aperture 311 and threaded member 312. The threaded bolt 310 may be engaged with member 312 to withdraw the service brake actuator toward the housing intermediate flange 309 to positively compress and hold spring 300 therein. This new spring brake actuator arrangement preserves the "fail-safe" nature of prior art spring-type brake actuators (i.e., loss of pressure in the rear chamber results in the brake actuator spring re-applying the brake), while also positively capturing the spring between the spring plate and the intermediate flange. Among the many advantages resulting from the rearrangement of the previously known actuator components in this new spring brake actuator design is a significant decrease in the structural requirements on the housing (in particular, the rear portion of the housing), and the inherent self-capture of the powerful brake actuator spring, which makes actuator manufacture and servicing inherently safer.

A disadvantage of prior spring brake actuators is top portion of the rear chamber typically does not possess a great deal of inherent strength against being pulled inward (i.e., toward the service brake actuator) due to the relatively thin section of the rear chamber cover near its center. This can becomes a particular problem when the rear chamber cover is used to provide a base for drawing the service brake actuator outward in order to compress the power spring, either because the cover is too thin to form a sufficient number of threads for a threaded rod to engage without thread shearing, or in the case of a withdrawal rod which rests against an outside surface of the rear chamber, the chamber end is too thin to prevent chamber collapse as the power spring is compressed.

Accordingly, it is an object of the present invention to provide a rear chamber reinforcement and a unique method of attaching the reinforcement which does not rely on welding, gluing, bolted connections or other conventional attachment approaches to secure the reinforcements.

It is a further objective of the present to provide a reinforcement and a method of attaching the reinforcement which can be executed quickly, easily, reliably and at low cost.

It is another objective of the present invention to provide a reinforcement and a method of attaching the reinforcement which provides an enhanced environmental seal seating surface in a simple and cost-effective manner.

These and other objectives are met by a unique combination of reinforcement plates and a reinforcing plate crimping method, in which reinforcing plates with progressively smaller internal apertures are stacked about a center aperture of a rear chamber cover, and the innermost plate is deformed about is inner radius (for example, by crimping) laterally outward into the interior of the rear chamber. This deformation simultaneously draws the reinforcing plates into firm contact with the outside surface of the rear chamber cover, while also capturing the rear chamber cover therebetween. In a preferred embodiment, as the innermost reinforcing plate is crimped into place, a concentric ridge is formed in the portion of the rear chamber cover around the reinforced hole, thereby forming a dust-cover-retaining lip surface during the single reinforcement crimping operation.

Other objects, advantages and novel features of the present invention will become apparent from the following detailed description of the invention when considered in conjunction with the accompanying drawings.

DETAILED DESCRIPTION OF THE DRAWINGS

Figure 1:
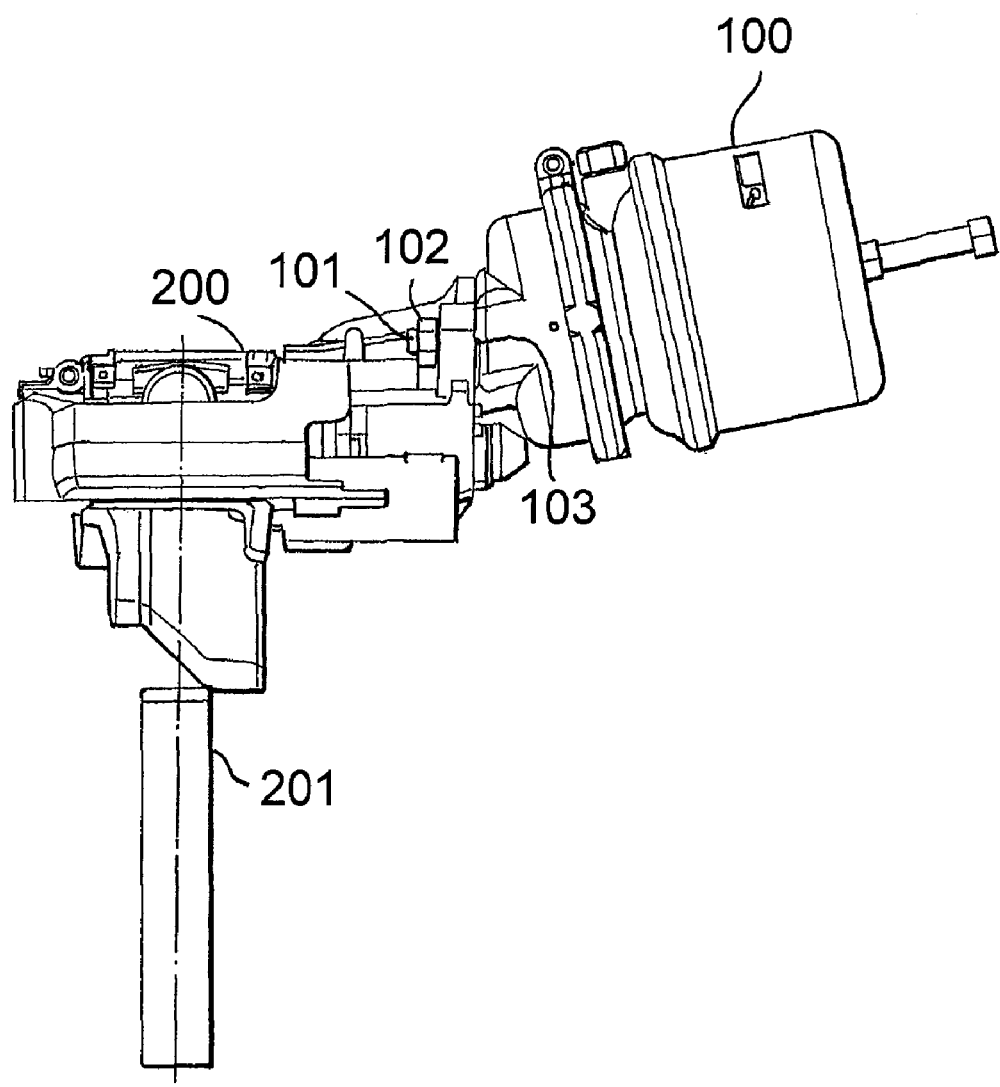
FIG. 1 is a side view of a disk brake illustrating a spring-type brake actuator mounted on a disk brake caliper.
Figure 2:
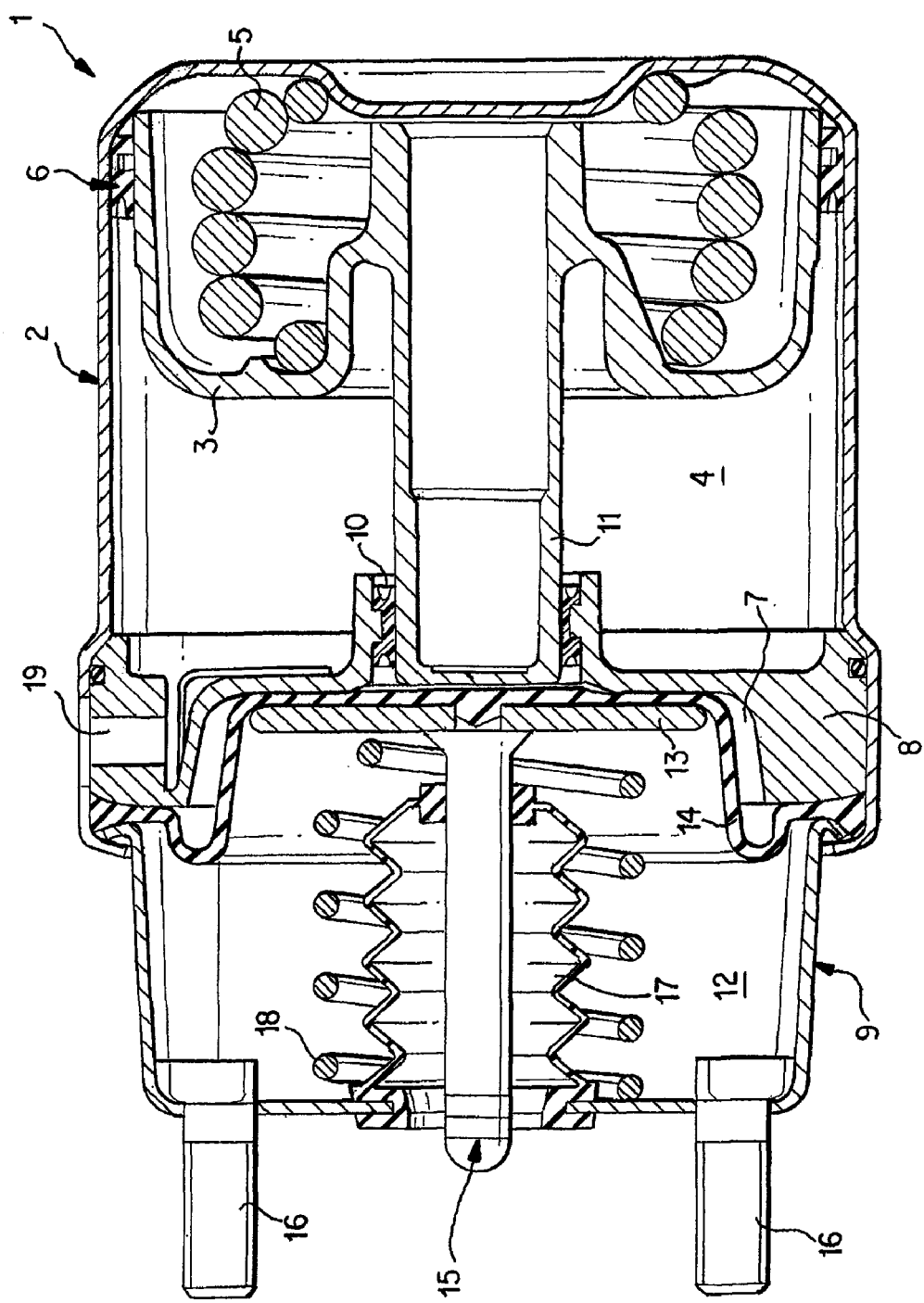
FIG. 2 is a cross-section view of a prior art spring-type brake actuator.
Figure 3:
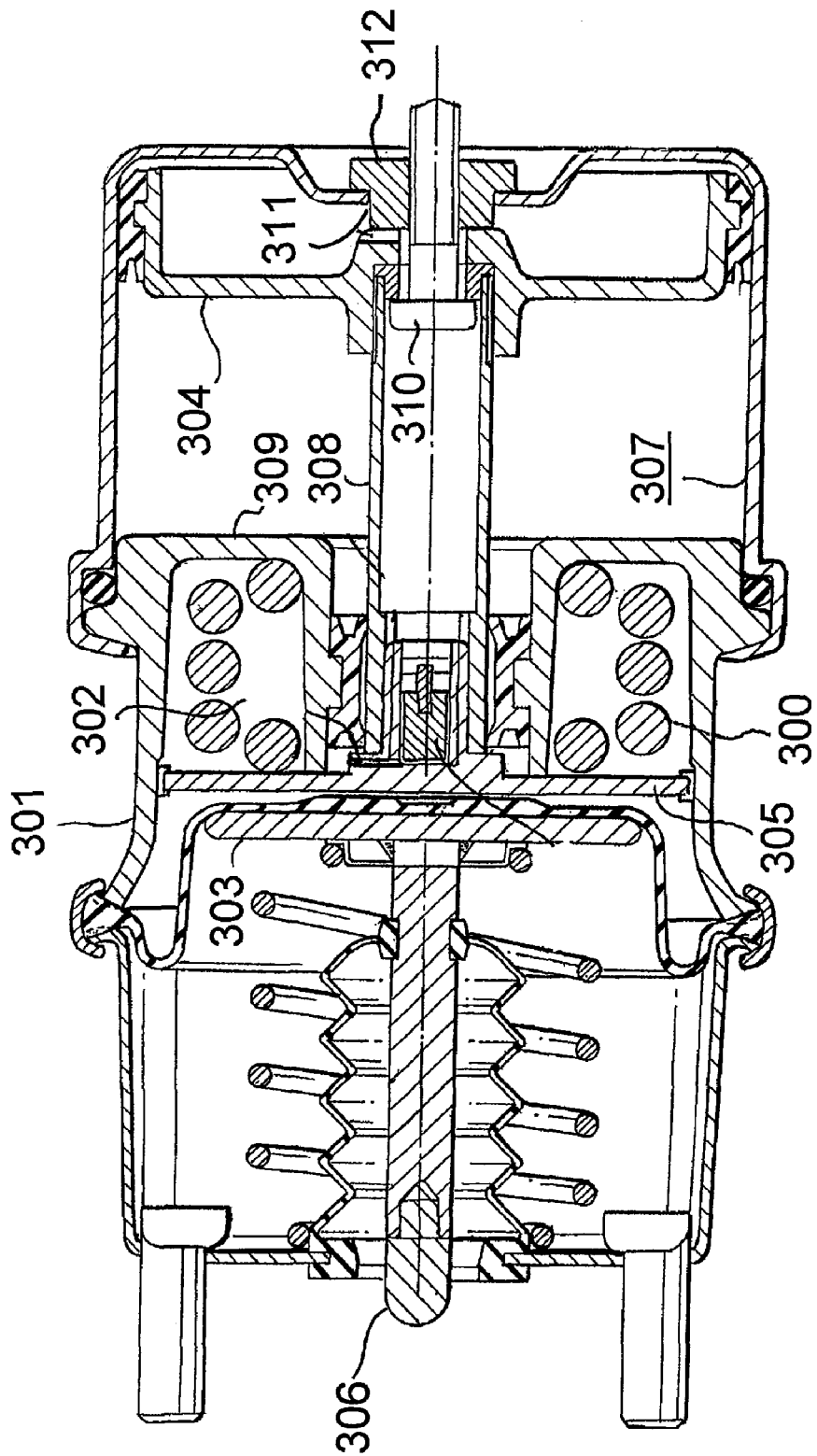
FIG. 3 is a cross-section view of an improved prior art spring-type brake actuator with its power spring located on a brake side of its intermediate flange.
Figure 4:
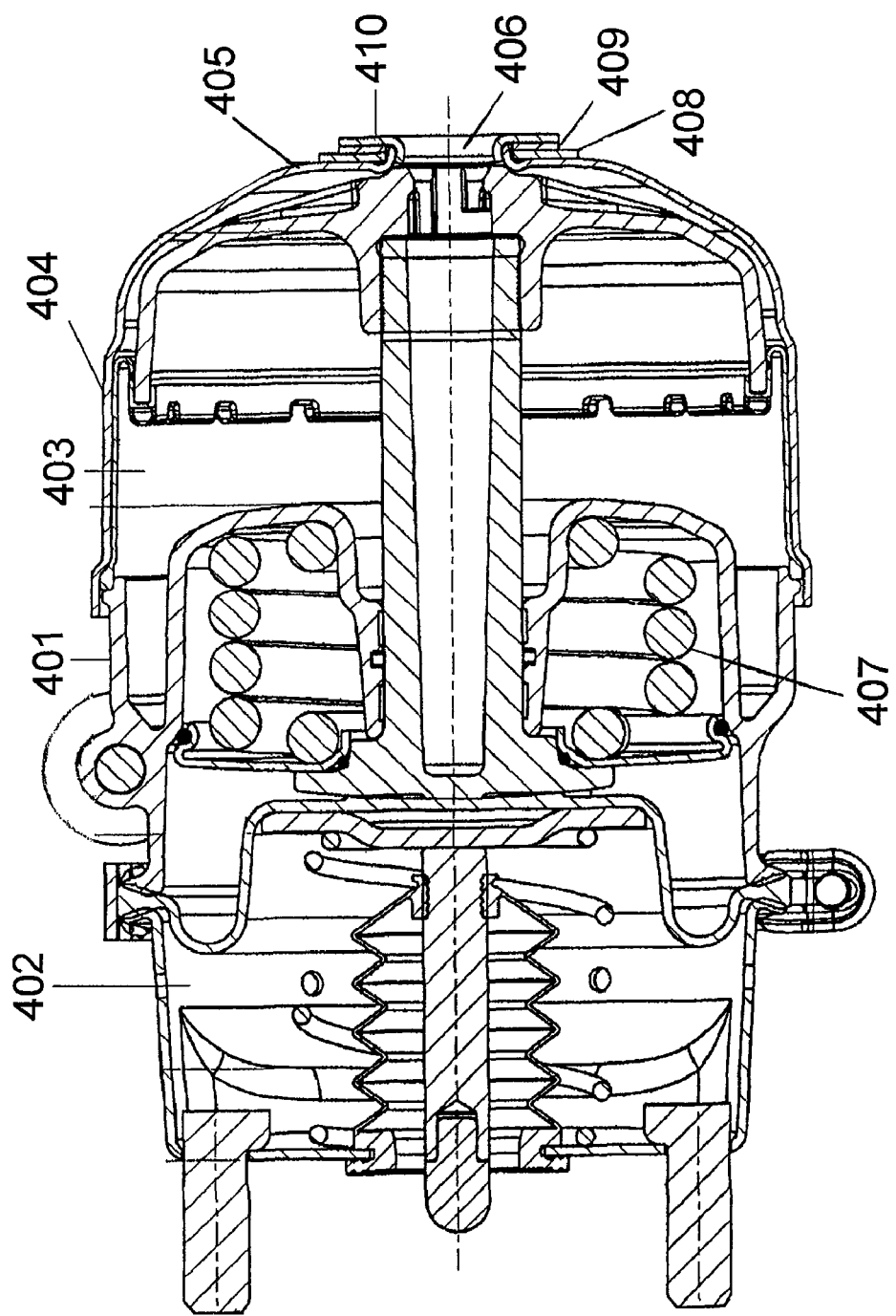
FIG. 4 is an cross-section view of a spring-type brake actuator including an embodiment of a rear chamber cover reinforcement in accordance with the present invention.

FIG. 4 is a cross-section view of a spring-type brake actuator including an embodiment of a rear chamber cover reinforcement in accordance with the present invention. As with the actuator shown in FIG. 3, this embodiment includes an intermediate flange 401, front chamber 402 at a vehicle brake end of the spring brake actuator, and rear chamber 403 with a rear chamber cover 404 on the opposite side of intermediate flange 401. The operating elements of spring brake actuator are similar in location and operation as the actuator in FIG. 3.

At a rear end 405 of rear chamber cover 404, an aperture 406 is provided for, for example, insertion of tool (not illustrated) to compress the actuator's power spring 407 into the intermediate flange 401, as shown. The aperture 406 may be formed with a stamped-in circular flange lip as shown. Because the material of rear chamber cover 404 is relatively thin and in this embodiment is formed from a stamped sheet of Aluminum, the rear end 405 of the cover does not possess high structural strength in the localized area near aperture 406. In order to reinforce this area, three reinforcing plates 408, 409 and 410 are located about the aperture 406. For ease of attachment and limited access reasons, they are installed with a unique crimp geometry, described further in connection with the detailed illustration of FIG. 5.

Figure 5:
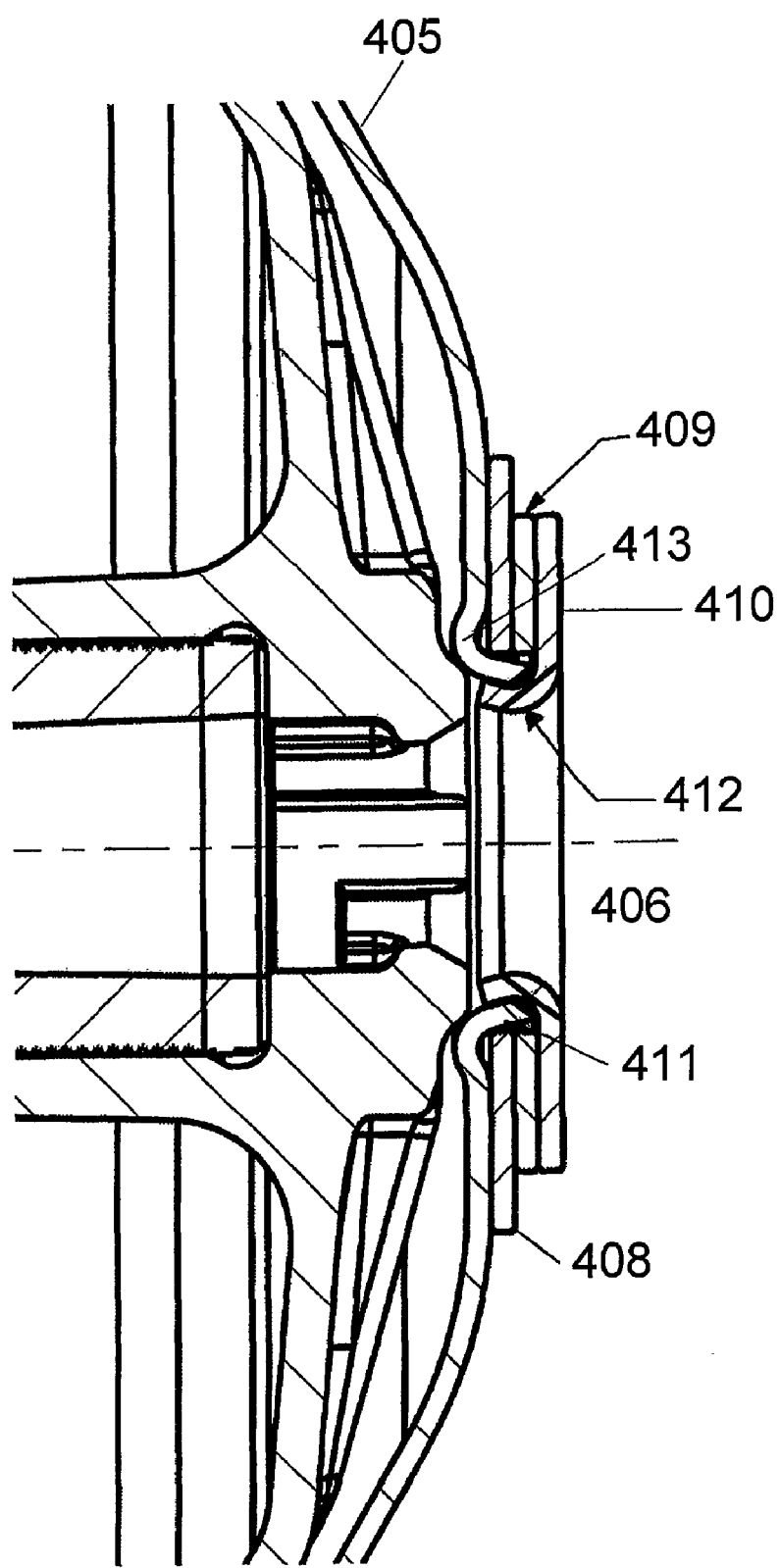
FIG. 5 is a detailed cross-section view the embodiment of the reinforcement shown in FIG. 4.

FIG. 5 is a detailed cross-section view of the reinforcement arrangements shown in FIG. 4. The reinforcing plate resting against the outer surface of the rear chamber cover 404, reinforcing plate 408, has the largest outer diameter of the three reinforcing plates, and a larger inner diameter than the diameter of aperture 406. Reinforcing plate 409 is shown sandwiched between plates 408 and 410, with a slightly smaller outer diameter than plate 408 but with a similar inner diameter. Finally, outer reinforcing plate 410 is shown with a substantially smaller inner diameter than both plates 408 and 409, and aperture 406.

The three reinforcing plates are affixed to the rear chamber cover 404 by crimping the inner diameter of reinforcing plate into the rear chamber. The configuration of the reinforcing plate inner diameters permits the inner edge 411 of rear chamber cover 404 (in this embodiment, the stamped-in circular flange lip about aperture 406) to become captured in the gap between the inner edges of reinforcing plates 408 and 409 and the inner edge of reinforcing plate 410 as plate 410 is bent over at region 412. As the inner edge of reinforcing plate 410 enters the rear chamber to secure the plates to the cover, the rear chamber cover flange lip is caught between, and pressed outward toward the reinforcing plates, as the inner edge of reinforcing plate 410 is be displaced under and/or behind lip to prevent release of the reinforcing plates.

A further benefit of this approach to securing reinforcing plates to the rear chamber cover is ability to form a ridge 413 on the inside surface of the rear chamber cover, immediately adjacent to the aperture 406. Such a ridge provides a desirable raised surface for receiving a sealing lip of a seal member, such as a dust plug (not illustrated), to ensure a positive sealing of the rear chamber from the environment when a power spring compression tool is not installed in the actuator.

The present invention's advantages are also evidenced during manufacturing assembly. Because the reinforcing plates are easily aligned and crimped into place with minimal tooling and few assembly steps, the reinforced rear chamber covers may be produced very economically and very quickly. Moreover, because relatively large tolerances may be readily accommodated, costs associated with tight tolerance parts are avoided. A further advantage is low weight, as the addition of small plates (three in the foregoing embodiment, but either two or more than three may be used, as long as the cover lip is captured between the edges of the reinforcing plates, as shown in FIG. 5) does not impose a significant weight penalty, particularly whether the addition of the reinforcing plates permits the rear chamber cover to be made from a thinner or otherwise lighter amount of material.

The foregoing disclosure has been set forth merely to illustrate the invention and is not intended to be limiting. For example, any of a wide variety of well-known reinforcing plate shapes and contours may be employed to reinforce the rear chamber cover, and the crimping of reinforcing plate 410 may be performed with a plurality of separate tabs or strips, rather than deforming the entire inner radius of the plate around the edge of the cover aperture. Because other such modifications of the disclosed embodiments incorporating the spirit and substance of the invention may occur to persons skilled in the art, the invention should be construed to include everything within the scope of the appended claims and equivalents thereof.

What is claimed is:

1. A spring brake actuator, comprising:
   a brake actuator spring;
   a parking brake release actuator;
   a service brake actuator; and
   a rear chamber cover enclosing a chamber containing the parking brake release actuator,
   wherein
      the brake actuator spring is disposed between the service brake actuator and the parking brake release actuator,
      the rear chamber cover includes an aperture co-axially aligned with the parking brake release actuator, and
      a plurality of reinforcing plates is stacked on the rear chamber cover at the aperture, and an inner diameter portion of an outermost one of the plurality reinforcing plates furthest from the rear chamber cover is crimped about an inner diameter of the rear chamber cover aperture such that the plurality of reinforcing plates is affixed to the rear chamber cover.

2. The spring brake actuator of claim 1, wherein the inner diameter portion of the outermost one of the plurality of reinforcing plates is smaller than an inner diameter of each of the remaining reinforcing plates, and
   a portion of the rear chamber cover adjacent to the aperture is captured between the outermost one of the plurality of reinforcing plates and the remaining reinforcing plates.

3. The spring brake actuator of claim 2, wherein
the plurality of reinforcing plates includes three plates, and
   an outer diameter of an innermost one of the reinforcing plates in contact with the rear chamber cover is larger than an outer diameter of a middle one of the reinforcing plates.

4. The spring brake actuator of claim 2, wherein
the portion of the rear chamber cover adjacent to the aperture is formed as a lip protruding axially away from the rear chamber.

5. The spring brake actuator of claim 3, wherein
the portion of the rear chamber cover adjacent to the aperture is formed as a lip protruding axially away from the rear chamber.

6. The spring brake actuator of claim 4, wherein
a portion of the rear chamber cover adjacent to the lip portion is formed as a seal-receiving ridge protruding into the rear chamber.

7. The spring brake actuator of claim 5, wherein
a portion of the rear chamber cover adjacent to the lip portion is formed as a seal-receiving ridge protruding into the rear chamber.

8. A disk brake, comprising:
a disc brake caliper arranged to straddle a brake disk rotor, and
a spring brake actuator affixed to the disk brake caliper, the actuator including
   a brake actuator spring;
   a parking brake release actuator;
   a service brake actuator; and
   a rear chamber cover enclosing a chamber containing the parking brake release actuator,
   wherein
      the brake actuator spring is disposed between the service brake actuator and the parking brake release actuator,
      the rear chamber cover includes an aperture co-axially aligned with the parking brake release actuator, and
      a plurality of reinforcing plates is stacked on the rear chamber cover at the aperture, and an inner diameter portion of an outermost one of the plurality reinforcing plates furthest from the rear chamber cover is crimped about an inner diameter of the rear chamber cover aperture such that the plurality of reinforcing plates is affixed to the rear chamber cover.

9. A method of reinforcing a rear chamber cover of a spring brake actuator, comprising the steps of:
   locating a plurality of reinforcing plates in a stack adjacent to an aperture of the rear chamber cover, and
   crimping an inner diameter portion of an outermost one of the plurality reinforcing plates furthest from the rear chamber cover about an inner diameter of the aperture to affix the plurality of reinforcing plates to the rear chamber cover.

10. The method of claim 9, wherein
the inner diameter portion of the outermost one of the plurality of reinforcing plates is smaller than an inner diameter of each of the remaining reinforcing plates, and
a portion of the rear chamber cover adjacent to the aperture is captured between the outermost one of the plurality of reinforcing plates and the remaining reinforcing plates.

11. The method of claim 10, wherein
the plurality of reinforcing plates includes three plates, and
   an outer diameter of an innermost one of the reinforcing plates in contact with the rear chamber cover is larger than an outer diameter of a middle one of the reinforcing plates.

12. The method of claim 10, further comprising the step of:
forming the portion of the rear chamber cover adjacent to the aperture as a lip protruding axially away from a rear chamber.

13. The method of claim 11, further comprising the step of:
forming the portion of the rear chamber cover adjacent to the aperture as a lip protruding axially away from a rear chamber.

14. The method of claim 12, further comprising the step of:
forming a portion of the rear chamber cover adjacent to the lip portion as a seal-receiving ridge protruding into the rear chamber.

15. The method of claim 13, further comprising the step of:
forming a portion of the rear chamber cover adjacent to the lip portion as a seal-receiving ridge protruding into the rear chamber.

* * * * *